(No Model.)

P. THURMAN.
DRAG SAW.

No. 366,899. Patented July 19, 1887.

WITNESSES:
J. D. Garfield
C. Sedgwick

INVENTOR:
P. Thurman
BY Munn & Co.
ATTORNEYS.

UNITED STATES PATENT OFFICE.

PHILLIP THURMAN, OF NEW FLORENCE, MISSOURI.

DRAG-SAW.

SPECIFICATION forming part of Letters Patent No. 366,899, dated July 19, 1887.

Application filed August 28, 1886. Serial No. 212,055. (No model.)

*To all whom it may concern:*

Be it known that I, PHILLIP THURMAN, of New Florence, in the county of Montgomery, and in the State of Missouri, have invented a new and Improved Drag-Saw, of which the following is a full, clear, and exact description.

This invention relates to improvements in drag-saws; and it consists of a certain combination of parts, including their construction, substantially as hereinafter described, and pointed out in the claim.

Reference is to be had to the accompanying drawings, forming a part of this specification, in which similar figures of reference indicate corresponding parts in both the views.

Figure 1:
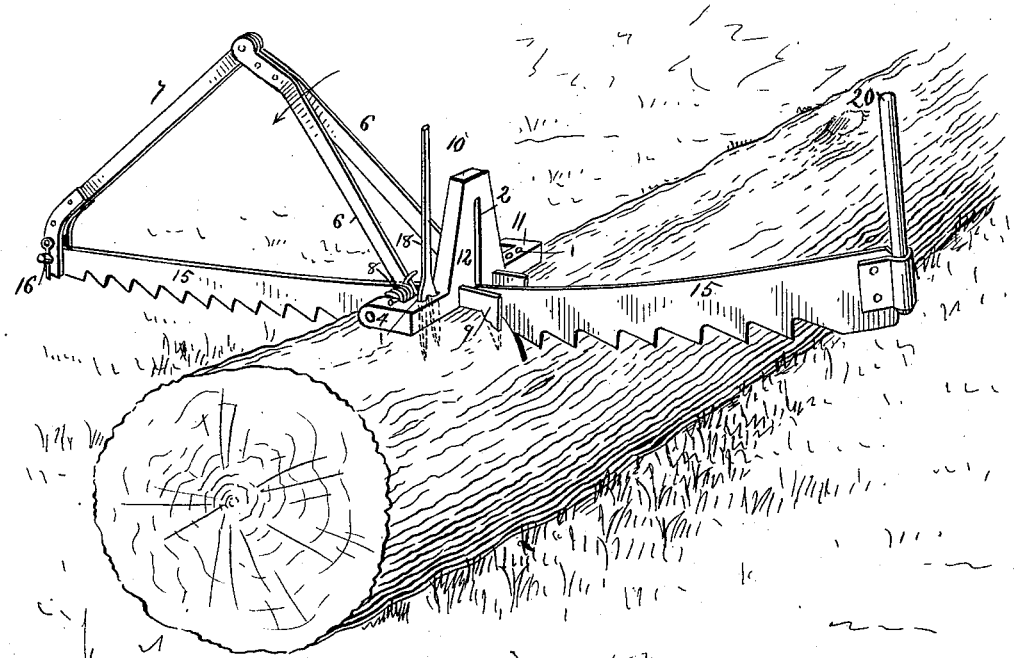
Figure 2:
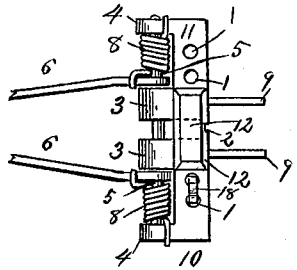

Figure 1 is a perspective view illustrating my improved form of drag-saw as in position for use, and Fig. 2 is a plan view of the dog employed in connection with the saw.

In the drawings, 10 represents a dog, which is preferably formed of cast metal, and which has a platform, 11, and a vertical standard, 12, that is centrally apertured or slotted, as shown at 2. To the rear of the standard 12 there are two lugs, 3 3, and beyond the lugs at the ends of the plate 11 there are other lugs 44, each pair of lugs 3 and 4 serving as the support for a short shaft, 5, upon which there is mounted an upwardly-extending arm, 6. Between the upper ends of the arms 6 there is pivotally connected a lever or arm, 7, the lower end of which is bifurcated to receive the end of the saw 15, which saw is held to place by a pin, 16, as best shown in Fig. 1. Spiral springs 8 are coiled about the shafts 5, the ends of said springs being bent over and one end arranged to rest upon the upper face of the adjacent lug 4, while the other end is arranged to bear upon the upper edge of the adjacent arm 6.

The teeth 9 of the dog 10 project forward from the plate 11, and are arranged so that they may be forced into the log or timber, as indicated in Fig. 1, and in order that the dog as a whole may be securely fastened to the log or timber and prevented from turning I form apertures 1 through the plate 11, and through these apertures I pass the bifurcated end of a retaining-pin, 18, said pin being arranged with a long handle, so that it may be rocked to disengage its pointed and bifurcated end, which, as shown in Fig. 1, is driven into the log.

The teeth of the saw, 15, are preferably formed so that their forward edges are at right angles to the back of the saw, while their rear edges are inclined backward, this construction being adopted in order that the preponderance of the cut may be made upon the forward stroke.

In operation the dog is placed in the position indicated, and a reciprocating movement is imparted to the saw, the operator at this time grasping the handle 20. As the saw is reciprocated, it is continually held down within the cut by the action of the springs 8, which tend to throw the arms 6 downward in the direction of the arrow shown in connection therewith.

This saw has been found to operate in a most satisfactory manner, and as it may be made at an exceedingly low cost it is thought that it will become an exceedingly popular implement.

It will of course be understood that the saw could be used for cutting down timber as well as for sawing, as illustrated in the drawings.

Having thus described my invention, I claim as new and desire to secure by Letters Patent—

The drag saw support comprising the vertically-slotted standard having forwardly-projecting teeth and a base or platform having at its rear side lugs, the arms with their lower divergent ends pivotally connected to a shaft supported in the said lugs, the springs applied to said shaft and exerting their pressure downwardly upon said arms, and the connecting-arm connecting the upper convergent ends of the aforesaid arms with the rear end of the saw-blade, substantially as set forth.

PHILLIP THURMAN.

Witnesses:
THOS. J. POWELL,
D. C. GAMMAGE.